US011142352B2

(12) United States Patent
Gandhi et al.

(10) Patent No.: US 11,142,352 B2
(45) Date of Patent: Oct. 12, 2021

(54) APPARATUS AND METHOD FOR FILLING BULK MATERIALS INTO A CONTAINER

(71) Applicant: Azurity Pharmaceuticals, Inc., Woburn, MA (US)

(72) Inventors: Premal Gandhi, Andover, MA (US); James B. Nagle, Gloucester, MA (US); Kevin Hacker, Boston, MA (US)

(73) Assignee: Azurity Pharmaceuticals, Inc., Woburn, MA (US)

( * ) Notice: Subject to any disclaimer, the term of this patent is extended or adjusted under 35 U.S.C. 154(b) by 28 days.

(21) Appl. No.: 16/318,819

(22) PCT Filed: Jul. 18, 2017

(86) PCT No.: PCT/US2017/042572
§ 371 (c)(1),
(2) Date: Jan. 18, 2019

(87) PCT Pub. No.: WO2018/017561
PCT Pub. Date: Jan. 25, 2018

(65) Prior Publication Data
US 2019/0185187 A1    Jun. 20, 2019

Related U.S. Application Data

(60) Provisional application No. 62/363,619, filed on Jul. 18, 2016.

(51) Int. Cl.
*B65B 1/00* (2006.01)
*B65B 1/06* (2006.01)
(Continued)

(52) U.S. Cl.
CPC ............. *B65B 1/06* (2013.01); *B65B 1/28* (2013.01); *B65B 1/32* (2013.01); *B65B 1/34* (2013.01);
(Continued)

(58) Field of Classification Search
CPC .... B65B 1/00; B65B 1/06; B65B 1/30; B65B 1/32; B65B 1/34; B65B 37/00; B65B 37/02; B65B 37/18; B65B 65/00; B65B 65/003
See application file for complete search history.

(56) References Cited

U.S. PATENT DOCUMENTS 3,263,496 A    8/1966   Fathauer
3,746,924 A    7/1973   Testone
(Continued)

FOREIGN PATENT DOCUMENTS

CH         678570 A5    9/1991
CN        1791533 A     6/2006
(Continued)

OTHER PUBLICATIONS

PCT/US2017/042572, Sep. 29, 2017, International Search Report and Written Opinion.
(Continued)

*Primary Examiner* — Chelsea E Stinson
(74) *Attorney, Agent, or Firm* — Wolf, Greenfield & Sacks, P.C.

(57) ABSTRACT

A system and method for dispensing a powdered pharmaceutical into a bottle is disclosed. The system includes a filler having a powder filler head and respective weight sensor, two or more draft shields, and one or more static reduction devices. In some embodiments, the system also includes one or more dust extractors. In some embodiments, the static reduction device is an active static reduction device, such as one or more static bars. The two or more draft shields may include an inner draft shield to reduce small pressure and/or airflow changes and an outer draft to reduce large pressure and/or airflow changes.

39 Claims, 9 Drawing Sheets

(51) Int. Cl.

| | | |
|---|---|---|
| *B65B 57/14* | (2006.01) | |
| *B65B 55/24* | (2006.01) | |
| *B65B 1/28* | (2006.01) | |
| *G01G 17/00* | (2006.01) | |
| *B65B 1/34* | (2006.01) | |
| *B65B 37/02* | (2006.01) | |
| *B65B 37/18* | (2006.01) | |
| *G01G 21/28* | (2006.01) | |
| *G01G 13/02* | (2006.01) | |
| *B65B 65/00* | (2006.01) | |
| *B65B 1/32* | (2006.01) | |
| *G01G 3/15* | (2006.01) | |
| *B65G 69/18* | (2006.01) | |

(52) U.S. Cl.
CPC .............. *B65B 37/02* (2013.01); *B65B 37/18* (2013.01); *B65B 55/24* (2013.01); *B65B 57/14* (2013.01); *B65B 65/003* (2013.01); *G01G 3/15* (2013.01); *G01G 13/02* (2013.01); *G01G 13/024* (2013.01); *G01G 17/00* (2013.01); *G01G 21/286* (2013.01); *B65G 69/18* (2013.01)

(56) References Cited

U.S. PATENT DOCUMENTS

| | | | |
|---|---|---|---|
| 4,096,894 A | | 6/1978 | Guy |
| 4,182,386 A | * | 1/1980 | Alack .................. B65G 69/182 141/83 |
| 4,526,214 A | | 7/1985 | McGregor |
| 5,038,839 A | | 8/1991 | Morimoto et al. |
| 5,287,897 A | * | 2/1994 | Gamberini .............. A61J 3/074 141/130 |
| 5,826,633 A | | 10/1998 | Parks et al. |
| 6,056,025 A | | 5/2000 | Wegman |
| 6,708,822 B1 | | 3/2004 | Muni |
| 7,193,164 B2 | | 3/2007 | Olesen et al. |
| 7,836,922 B2 | | 11/2010 | Poole et al. |
| 7,980,277 B2 | | 7/2011 | Amano |
| 8,158,896 B2 | | 4/2012 | Huack |
| 8,232,484 B2 | | 7/2012 | Huack |
| 8,568,747 B1 | | 10/2013 | Rajewski et al. |
| 8,778,366 B2 | | 7/2014 | Rajewski et al. |
| 8,853,567 B2 | | 10/2014 | Gottfriedsen et al. |
| 2005/0189150 A1 | | 9/2005 | MacMichael et al. |
| 2007/0131707 A1 | * | 6/2007 | Poole ....................... B65B 1/30 222/14 |
| 2012/0055579 A1 | | 3/2012 | Nufer et al. |
| 2014/0014416 A1 | | 1/2014 | Feldotte et al. |
| 2015/0183531 A1 | * | 7/2015 | Verhoest ................. B29B 7/603 141/1 |
| 2015/0274339 A1 | * | 10/2015 | An .......................... B65B 57/00 53/493 |

FOREIGN PATENT DOCUMENTS

| | | |
|---|---|---|
| CN | 102435477 A | 5/2012 |
| CN | 102530277 A | 7/2012 |
| CN | 203667071 U | 6/2014 |
| CN | 105229353 A | 1/2016 |
| DE | 705715 C | 5/1941 |
| DE | 10053074 C1 | 3/2002 |
| DE | 102006010092 A1 | 9/2007 |
| DE | 202008017708 U1 | 5/2010 |
| DE | 10 2009 015 284 B4 | 10/2010 |
| DE | 102014210234 A1 | 12/2014 |
| EP | 0 408 822 A2 | 1/1991 |
| EP | 0 966 510 A1 | 5/2000 |
| JP | 2013167450 A | 8/2013 |
| WO | WO 99/03605 A1 | 1/1999 |

OTHER PUBLICATIONS

PCT/US2017/042572, Jan. 31, 2019, International Preliminary Report on Patentability.
International Search Report and Written Opinion for International Application No. PCT/US2017/042572, dated Sep. 29, 2017.
International Preliminary Report on Patentability for International Application No. PCT/US2017/042572, dated Jan. 31, 2019.
[No Author Listed] Competence in weighing technology. Wipotec Weighing Technologies. Publicly available prior to Jul. 18, 2016. 3 pages.
[No Author Listed] DMS load cell. Schenck Process. http://www.schenckprocess.com/products/glossary/dms-load-cell. Last accessed Apr. 10, 2019. 2 pages.
[No Author Listed] How to Handle Precise Weighing, Fine Batching and Accurate Filling . . . on the Fly. HBM. https://web.archive.org/web/20150525152209/http://www.hbm.com:80/en/menu/applications/dynamic-weighing/. Jul. 18, 2015. 2 pages.
[No Author Listed] Lift up technology. Wipotec Weighing Technologies. Publicly available prior to Jul. 18, 2016. 5 pages.
[No Author Listed] Pharmaceutical Industy. Per-Fil. https://web.archive.org/web/20160319001443/http://www.per-fil.com/industries-we-serve/pharmaceutical-industry-anger-filler/. Mar. 19, 2016. 3 pages.
[No Author Listed] Weigh cell SW 100/400-D-FS-12-13-14-26-27. OCS Checkweighers. Dec. 3, 2013, 2 pages.
[No Author Listed] Weigh Cell SW-D-FS + NT17 Conveyor (IP44). Wipotec Weighing Technologies. https://www.wipotec-wt.com/en/weighing-kits/sw-d-fs-nt17/. Last accessed Apr. 9, 2019. 3 pages.
[No Author Listed] Weighing Principle. Wipotec Weighing Technology. https://www.wipotec-wt.com/en/company/weighing-principle/. Last accessed Apr. 9, 2019. 4 pages.
Partial European Search Report dated Jan. 7, 2020 for Application No. EP 17831681.6.
Extended European Search Report dated Apr. 4, 2020 for Application No. EP 17831681.6.
17831681.6, Jan. 7, 2020, Partial European Search Report.
17831681.6, Apr. 24, 2020, Extended European Search Report.

\* cited by examiner

| Active Pharmaceutical Ingredient | Weight |
|---|---|
| Diphenhydramine HCl | 108 mg – 582 mg |
| Lidocaine HCl | 0.816 g – 1.77 g |
| Nystatin | 0.61 g – 1.77 g |
| Hydrocortisone | .062 g – 0.064 g |
| Tetracycline HCl | 1.54 g – 1.70 g |
| Omeprazole | 175.0 mg – 618 mg |
| Lansoprazole | 262.0 mg – 927 mg |
| Vancomycin HCl | 3.74 gm – 15.76 gm |

FIG. 2

APPARATUS AND METHOD FOR FILLING BULK MATERIALS INTO A CONTAINER

CROSS-REFERENCE TO RELATED APPLICATIONS

This Application is a national stage filing under 35 U.S.C. 371 of International Patent Application Serial No. PCT/US2017/042572, filed Jul. 18, 2017, entitled "APPARATUS AND METHOD FOR FILLING BULK MATERIALS INTO A CONTAINER", which is a Non-Prov of Prov (35 USC 119(e)) of U.S. Application Serial No. 62/363,619, filed Jul. 18, 2016, entitled "APPARATUS AND METHOD FOR FILLING BULK MATERIALS INTO A CONTAINER". The entire contents of these applications are incorporated herein by reference in their entirety.

FIELD

The disclosed embodiments are generally directed to production processes, and more particularly to apparatuses and methods used to fill a container with a bulk material, such as a powdered pharmaceutical.

BACKGROUND

Typically, augers are used to fill bulk materials, such as powders, into a container. Some augers dispense powders volumetrically while other augers may dispense powders gravimetrically. For some purposes, such as for the production of foods and cosmetics, precise measurement of the bulk materials dispensed into the container may not be necessary. For other purposes, such as for the production of pharmaceutical preparations, high filling precision may be needed.

SUMMARY

According to one embodiment, a system for filling a powdered pharmaceutical into a bottle is disclosed. The system includes a filler having a first powder filler head arranged to dispense a powdered pharmaceutical into a bottle and a first weight sensor positioned below the first powder filler head, one or more static reduction devices arranged to reduce static generated during a filling process, and two or more draft shields, each of the two or more draft shields being positioned around at least a portion of the filler.

According to another embodiment, a method of filling a bottle with a prescribed weight of a powdered pharmaceutical via a filling system is disclosed. The filling system includes a filler with a first powder filler head and a weight sensor positioned below the powder filler head, one or more static reduction devices arranged to reduce static during a filling process, and two or more draft shields The method includes transferring an empty bottle to a first powder filler head of a filler, the empty bottle passing by one or more static reduction devices as the empty bottle moves towards an outlet of the first powder filler head, filling the empty bottle with the powdered pharmaceutical via the first powder filler head, reducing a draft during a filling process via two or more draft shields, each of the two or more draft shields being positioned around at least a portion of the filler, and transferring a filled bottle from the first powder filler head to a downstream station.

It should be appreciated that the foregoing concepts, and additional concepts discussed below, may be arranged in any suitable combination, as the present disclosure is not limited in this respect.

The foregoing and other aspects, embodiments, and features of the present teachings can be more fully understood from the following description in conjunction with the accompanying drawings.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 2 is a table listing several illustrative APIs that may be dispensed into a container using the filling system of FIG. 1, with a range of API weights that may be dispensed into the container;

DETAILED DESCRIPTION

Figure 1:
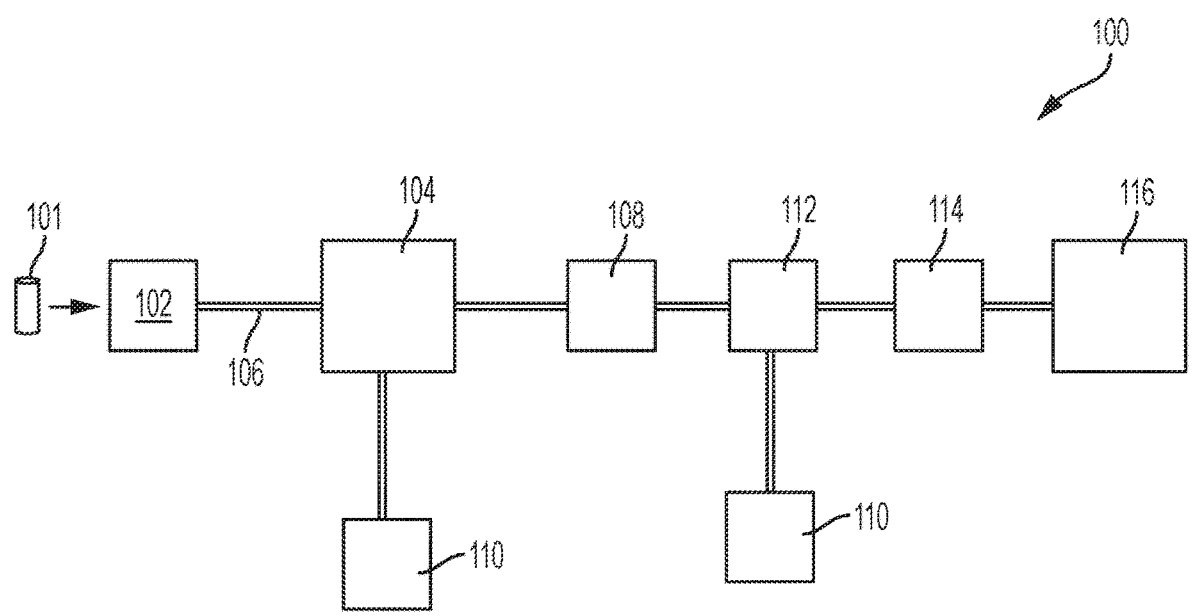
FIG. 1 is a schematic representation of a filling system according to one embodiment.

Filling systems are used to dispense bulk materials, such as powders, into containers. For example, filling systems may be used to dispense powdered milk, baby formula, vitamins, and/or pharmaceutical preparations (hereinafter referred to as "pharmaceuticals"). As will be appreciated, the amount of powder added to each bottle may depend on the bottle size and/or the dosing. For example, more powder may be dispensed into a larger container than a smaller container. For pharmaceuticals, more powder also may be dispensed into a container providing a higher dosage of an active pharmaceutical ingredient (hereinafter referred to as an "API") than a lower dosage of the API.

For many purposes, such as for the production of food and cosmetic products, precise measurement of the bulk materials dispensed into the containers may not be necessary. Applicant has recognized that auger filling equipment with minimal modifications and/or manipulations may be adequate for such purposes. However, for certain preparations, such as the preparation of pharmaceuticals, there may be a need for high filling precision to comply with quality standards set by governing bodies such as the Food and Drug Administration (FDA), the United States Pharmacopeia (USP), and the International Conference on Harmonization (ICH).

Typically, pharmaceuticals dispensed into a container include the API and one or more fillers, such as one or more excipients and/or glidants. Such excipients and/or glidants may be used to assist with the filling process, such as by facilitating movement of a powdered pharmaceutical through the equipment and/or by making it easier to determine the weight of the pharmaceutical. Excipients and/or glidants also may be used to extend the shelf life of a particular pharmaceutical by protecting the API from moisture uptake, caking, and/or degradation.

Applicant has recognized that by filling containers with a pharmaceutical that includes only the pure API, without any such excipients and/or glidants, various advantages may be realized. For example, a pure-API pharmaceutical (e.g., with no fillers) may have better biocompatibility and/or have an easier uptake by the consumer. As another example, preparation of kits for pharmaceutical compounding and/or reconstitution with only the pure-API pharmaceutical (e.g., with no fillers) may allow for commercial use in pharmaceutical compounding under Section 503A of the Food Drug and Cosmetic Act, which stipulates that only unadulterated forms of API can be used in the preparation of compounded drugs (i.e., API powder without excipients and/or glidants).

As will be appreciated, in such instances, very small quantities of the pharmaceutical may be dispensed into each container, such as to conform to dose strengths prescribed by physicians. Applicant has recognized that achieving a proper balance of filling accuracy as well as filling throughput for commercial viability is especially problematic at very low container fill quantities, such as when a container is filled with just the pure API pharmaceutical. Applicant has further recognized that typical filling systems do not dispense low quantities of the pharmaceutical into containers satisfactorily in all aspects. For example, the pure API pharmaceutical may be difficult to measure and, thus, difficult to accurately dose when the powdered pharmaceutical is dispensed in the container. The pure API pharmaceutical also may not move through the filling equipment as easily and/or may cause parts of the filling equipment to be less effective or even fail over time. For example, Applicant has recognized that electrostatic interference and powder particulate interactions may compromise the ability to dispense powders with appropriate accuracy and throughput.

To that end, embodiments disclosed herein include a filling system with a filler having one or more powder filler heads and respective weight sensors, two or more draft shields to reduce drafts during the filling process, and one or more static reduction devices. In some embodiments, the filling system also includes one or more dust extractors, such as dust shrouds, arranged to remove dust generated during the filling process.

According to one aspect, the filling system includes one or more powder fillers, such as an auger, having a filler head (e.g., an auger head) with a rotating member that rotates to dispense the powdered pharmaceutical into the container. In some embodiments, the filler may dispense the powder into the container gravimetrically (e.g., based on the weight of the powder). In such embodiments, the powder may be dispensed into the container until the target API dose, plus or minus any tolerances, such as tolerances allowed for compliance with the United States Pharmacopeia (USP) guidelines, is filled into the container. For example, the prescribed weight of powder disposed into the container may be the target API dose plus or minus 10 percent, or plus or minus 5 percent. In some embodiments, such a gravimetric filler may be used when the weight of the powder being added to the container is orders of magnitude less (e.g., 2-20 times) than the weight of the container. In other embodiments, the powder may be disposed into the containers volumetrically (e.g., based on the volume of the powder). Such a volumetric filling may be achieved by rotating the auger for a target number of rotations or for a target period of time.

Without wishing to be bound by theory, in some embodiments, a gravimetric filler may dispense the pure API powder into the containers more accurately than a volumetric filler. For example, consistently and accurately transferring a small amount of pure API into a container via a certain number of auger rotations may be difficult when filling a large number of containers with the API. As will be appreciated, when filling the pure API into the container, there is a smaller threshold for inaccuracy as compared to filling a powdered medicine with fillers.

According to another aspect, the filling system includes a weight sensor positioned below the filler head to determine the weight of the powder (e.g., the pure API) being added to the bottle. In some embodiments, the weight sensor includes a magnetic displacement load cell. In such embodiments, an instant weight of the container may be taken and used to determine if the target weight of the API was achieved during the filling process. In other embodiments, the weight sensor may include strain gauge weight sensor, wherein a deflection or strain is determined and converted to a corresponding weight.

Applicant has realized that in embodiments in which a small amount of powder, such as the pure API pharmaceutical, is dispensed into the container, the magnetic displacement load cell may provide better accuracy and efficiency during the filling process. For example, in embodiments in which the weight of the container is orders of magnitude higher than the weight of the API, a magnetic displacement load cell may be used to quickly determine the small overall weight change of the bottle. That is, such a magnetic displacement load cell may allow consistent results when a large number of bottles is being filled with the filling system. As will be appreciated, while other weight sensors may be capable of determining such a small change in weight, such sensors may not be able to quickly achieve such a reading or may have to sacrifice accuracy for a faster reading.

According to another aspect, the filling system includes one or more static reduction devices to counteract static generated during the filling process. Applicant has realized that static generated during the filling process may negatively affect the accuracy of the powder filling. For example, in some embodiments, an electric charge pulling on the load cell may affect the weight measurement recorded by the load cell. In such an example, the load cell may register a weight that is 20-30 mg higher or lower than the actual weight of the powder in the container. In some embodiments, static may be generated via movement of the bottles through the filling system. For example, static may be generated when a first plastic bottle makes contact with a second, adjacent plastic bottle.

In some embodiments, the static reduction devices are passive devices. For example, in some embodiments, the filling system may include equipment, such as conveyor belts, bottle guides, and/or fillers, that are made of materials that can dissipate static electricity. In some embodiments, this equipment may be made of a stainless steel material and/or of static dissipative plastic (e.g., an Acetal Delrin material). Such a static dissipative plastic may be any suitable color, such as a black plastic material. As will be appreciated, other electrostatic dissipating materials also may be used in other embodiments. In some embodiments, the filling equipment may be earth grounded together. For example, the filling system may be connected to a common earth ground.

In other embodiments, the static reduction devices are active devices. For example, in some embodiments, one or more static bars may be placed near or adjacent to an upstream conveyor belt transporting bottles to the filler. Such static bars may ionize the air around the bottles via stainless steel points or tips that create arcs in the air. In some embodiments, the static bars are in the shape of a rod, although they may have any suitable shape, such as ring-shaped. In place of, or in addition to the static bars, a static blower may be used. Such a static blower may blow ionized air over and/or around the bottles travelling through the system. In some embodiments, an ionizer may be placed at or near the filler head(s), such as adjacent to a filler head outlet, to ionize the air around the powder being dispensed into the container.

According to another aspect, the filling system may include one or more dust extractors. In some embodiments, dust may form when the powdered medicine, such as the powdered API, is dispensed from the filler head and into the container. Applicant has realized that such dust may be attracted to and collect on the static reduction devices and that, over time, the buildup of dust may reduce the efficacy of the static reduction devices. This, in turn, may affect the weight measured by the weight sensor(s), as described above. Applicant has further realized that the level to which the dust affects the powdered medicine also depends on the characteristics of the powder. For example, powders with very small particle size and non-cohesive flowability may tend to become dusty during dispensing and may require dust control, as will be described.

In some embodiments, the dust extractor includes a dust shroud positioned at or near (e.g., adjacent to) the filler head. For example, the dust shroud may be positioned at or near an outlet of the filler head, such as the end of the funnel closest to the container into which the powdered medicine (e.g., the pure API) is dispensed. In some embodiments, the dust shroud is connected to a vacuum source that removes air from around the filler head outlet to remove dust particles. In some embodiments, the vacuum is created by applying a pressure differential (e.g., a negative pressure differential) to remove the air and dust particles from around the outlet of the filler head. In such embodiments, the volume of air removed from around the filler head outlet is determined by measuring the pressure differential via one or more pressure sensors. In some embodiments, the pressure differential is high enough such that dust may be collected from around the filler head outlet but not so high that the powder being dispensed into the container is removed or that the container becomes unstable on the load cell.

In other embodiments, the volume of air being removed from around the filler head outlet may be determined by measuring the flow of air via one or more flow meters. In such embodiments, if the flow of air is too high it may be disturb powder flow out of the filler head and potentially the load cell. In contrast, low flow may not collect sufficient dust from the around the filler head outlet to prevent dust from collecting on one of the static bars.

As will be appreciated, the filling system also may utilize other methods to reduce dust formation during the filling process. For example, the rotation speed of the auger may be adjusted (e.g., reduced) to reduce the likelihood of dust formation during the filling.

According to another aspect, the filling system may include one or more housings, also referred to as draft shields, to minimize or reduce environmental drafts that may reach the filler and filler head(s). Applicant has realized that environmental drafts may affect the dispensing of powdered medicine (e.g., the pure API). For example, airflow may disrupt the flow of powder into the container and/or may cause dust particles to migrate onto the static bars, which may affect the reading of the weight sensor. In some embodiments, the filling system includes an outer draft shield to minimize or prevent large pressure and/or airflow movement from disrupting the filling process. For example, such an outer draft shield may minimize or prevent drafts caused by air vents, an HVAC system, and/or people passing by the equipment. In some embodiments, the outer draft shield may be positioned around the filler, such as around the filler heads, and/or around other portions of the filling system (e.g., portions of the conveyor belts brining containers to and from the filler heads). In some embodiments, the filling system also includes an inner housing to minimize or prevent small pressure and/or airflow movements from disrupting the filling process. For example, such an inner housing may minimize or prevent drafts created by neighboring equipment, such as a draft caused by the bottles moving along an upstream conveyor belt towards the filler head(s). In such an example, the inner housing may be positioned around at least a portion of the filler head(s), such as around the outlet(s) of the filler head(s) and/or the bottles moving toward and away from the outlet(s). As will be appreciated, in some embodiment, minimizing or preventing a draft from reaching the filler head also may minimize or prevent dust from being formed and/or from travelling from the filler head(s) outlet to the static reduction devices.

In some embodiments, the filling system also may include one or more housings or draft shields arranged to prevent contamination of the bottles. For example, the system may include one or more housings positioned downstream of the filler to prevent contaminants from entering into the containers once the powdered medicine has been dispensed into the container. In such an example, the draft shield may be located between the filler head(s) and a bottle capper. The draft shield also may be positioned around the bottle capper.

In some embodiments, the filling system may be used to fill containers with a powdered pharmaceutical that is provided directly to the consumer. In other embodiments, the filling system may be used to prepare kits for compounding or reconstitution of the pharmaceutical into a solution or suspension finished dosage form. As is known, kits for pharmaceutical compounding or reconstitution are used to prepare a liquid medication by adding a diluent liquid, such as water, to a volume of powdered medication.

Turning now to the figures, FIG. 1 shows a schematic illustration of a filling system 100 used to dispense bulk materials, such as powdered pharmaceuticals (e.g., a pure API pharmaceutical), into a container, such as bottle 101. As will be appreciated, although the system is described with respect to dispensation of a pure API pharmaceutical, the system also may be used to dispense any type of bulk material into the bottle. Additionally, although the system may be used for dispensation of small quantities of powders, it also may be used to dispense large quantities of powders.

As shown in FIG. 1, in some embodiments, the system includes a bottle cleaner and descrambler 102. In such embodiments, the bottle cleaner and descrambler may arrange the bottles in an upright position, with a top of the bottle facing upward, ready to receive the powder. From the bottle cleaner and descrambler 102, the bottle 101 may be transferred to the filler 104, where the bottle 101 is filled with powder. As will be appreciated, the bottle 101 may be transferred from the cleaner and descrambler 102 to the filler 104 (and from the filler 104 to another downstream station of the filling system) via any suitable methods, such as via a conveyor belt 106. In some embodiments, the conveyor belt may be formed of an electrostatic dissipating material.

At the filler 104, a prescribed amount, such as a prescribed weight, of the powdered pharmaceutical may be dispensed into the bottle 101. In some embodiments, the prescribed weight corresponds to a target dose of API, plus or minus any tolerances, such as tolerances allowed by regulatory or other associated governing bodies (e.g., the USP). In such embodiments, the prescribed weight may be the target API dose plus or minus 5 percent or 10 percent. For example, in an embodiment in which a target dose of 300 mg of Omeprazole is being dispensed into the container, the prescribed weight of Omeprazole dispensed into the container may include between 291.0 mg of Omeprazole and 309.0 mg of Omeprazole. Examples of APIs and ranges of weighs that the filling system may dispense into a bottle is shown in FIG. 2. As will be appreciated, the prescribed weight may be selected from within the range of weights shown in FIG. 2. As will be further appreciated, although various APIs and weight ranges are shown in FIG. 2, the filling system also may be used to fill the bottle with other APIs and at other weights. For example, the filling system may dispense from between about 25 mg and about 100 g of powder into the bottle.

In some embodiments, the filler 104 includes a weight sensor arranged to measure the weight of the powdered pharmaceutical dispensed into the bottle. In some embodiments, if the weight measured by the weight sensor is within the range of the prescribed weight, plus or minus any allowed tolerances, the bottle may be transferred from the filler 104 to a bottle capper 108 (see FIG. 1). In other embodiments, if the weight of the powder added to the bottle falls above or below the range of the prescribed weight, plus or minus any allowed tolerances, the bottle may be transferred to a reject tray 110. In such embodiments, the rejected bottle may be stored at the reject tray 110 until the bottle is retrieved and/or disposed of.

In some embodiments, the bottle is capped at the bottle capper 108 and is then transferred to a bottle sealer 112 to be sealed. In such embodiments, the sealed bottle may be examined to ensure that a proper seal has been applied. In some embodiments, if the bottle is not properly sealed, the bottle 101 may be transferred to a reject tray 110, where the bottle 101 may be retrieved and/or disposed of.

In some embodiments, if the bottle is determined to be filled correctly, the bottle may be labeled at a labeler 114 and thereafter transferred to an accumulator table 116. In some embodiments, a collection of filled bottles may be accumulated at the accumulator table 116 for packaging, storage, and/or shipment. In some embodiments, the bottles may be packaged for shipment to a pharmacy where they bottles may be provided directly to a consumer. In other embodiments, the bottles may be packaged into a kit for pharmaceutical compounding or reconstitution.

In some embodiments, the kit for compounding or reconstitution may contain just a bottle containing the powdered pharmaceutical (e.g., the pure API). The kit also may include other components, such as a second bottle with a diluent (e.g., water) that is later mixed with the powdered pharmaceutical to produce the oral suspension or solution that is provided to the consumer. The kit also may include a dispenser (e.g., a dosing cup and/or oral syringe) for dispensing the liquid pharmaceutical, and/or an instruction pamphlet.

Figure 3:
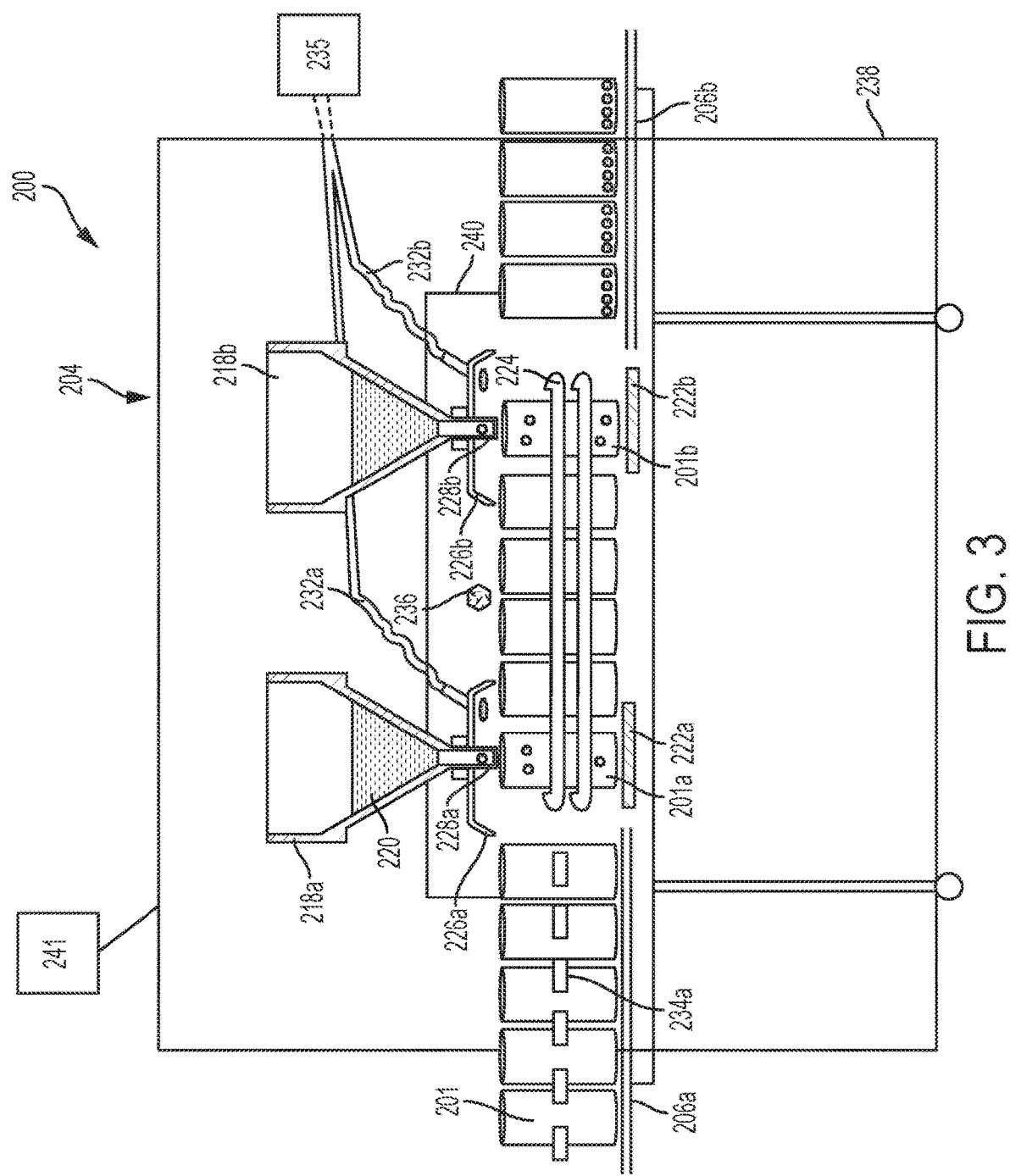
FIG. 3 is a schematic cross-sectional representation of a filling system having a filler with two filler heads according to one embodiment.

FIG. 3 illustrates a filler 204 of the filling system 200, according to one aspect. As shown in this figure, the filler 204 may include a dual head filler with two filler heads 218a, 218b (e.g., two auger heads) for dispensing the powdered pharmaceutical 220 into first and second bottles 201a, 201b position below the respective filler head. As will be appreciated, the filler head 204 may be arranged to accommodate any powder, whether or not it has excipients and/or glidants (or other fillers). For example, the auger, funnel and hopper design may be matched to the type of powder being dispensed (e.g., non-flowing, cohesive, easy flowing and free flowing).

As shown in FIG. 3, the dual head filler 204 may allow for simultaneous filling of two separate bottles 201a, 201b. In some embodiments, the filler is rated to be able to fill between 25 mg (0.025 g) and 100 g of powdered API per bottle. In some embodiments, the filler is configured to fill between 0.060 g and 16 g of API per bottle. In such embodiments, the filler heads 218a, 218b may have a rotation speed of between about 1 rpm to about 2000 rpm for dispensing this weight of powdered API. In some embodiments, the rotation speed may be between about 25 rpm and about 500 rpm.

In some embodiments, as illustrated in FIG. 3, the filler 204 includes weight sensors, load cells 222a, 222b, positioned below the filler heads 218a, 218b to measure the weight of the powder dispensed into each bottle 201a, 201b. For example, the load cells may be magnetic displacement load cells. In some embodiments, the load cells are each configured to handle bottles having a weight that is less than about 100 g. In such embodiments, the empty bottles may have a weight between about 15 g and 30 g (e.g., between about 3 oz and about 10 oz). For example, the filler 204 may dispense powdered API into different sizes of bottles, such as 3 oz, 5 oz, and 10 oz bottles. As will be appreciated, the bottle size used during filling may correspond to the weight of API being dispensed into the bottle. For example, smaller bottles may be used in instances where smaller weights of API are being dispensed.

Figure 4A:
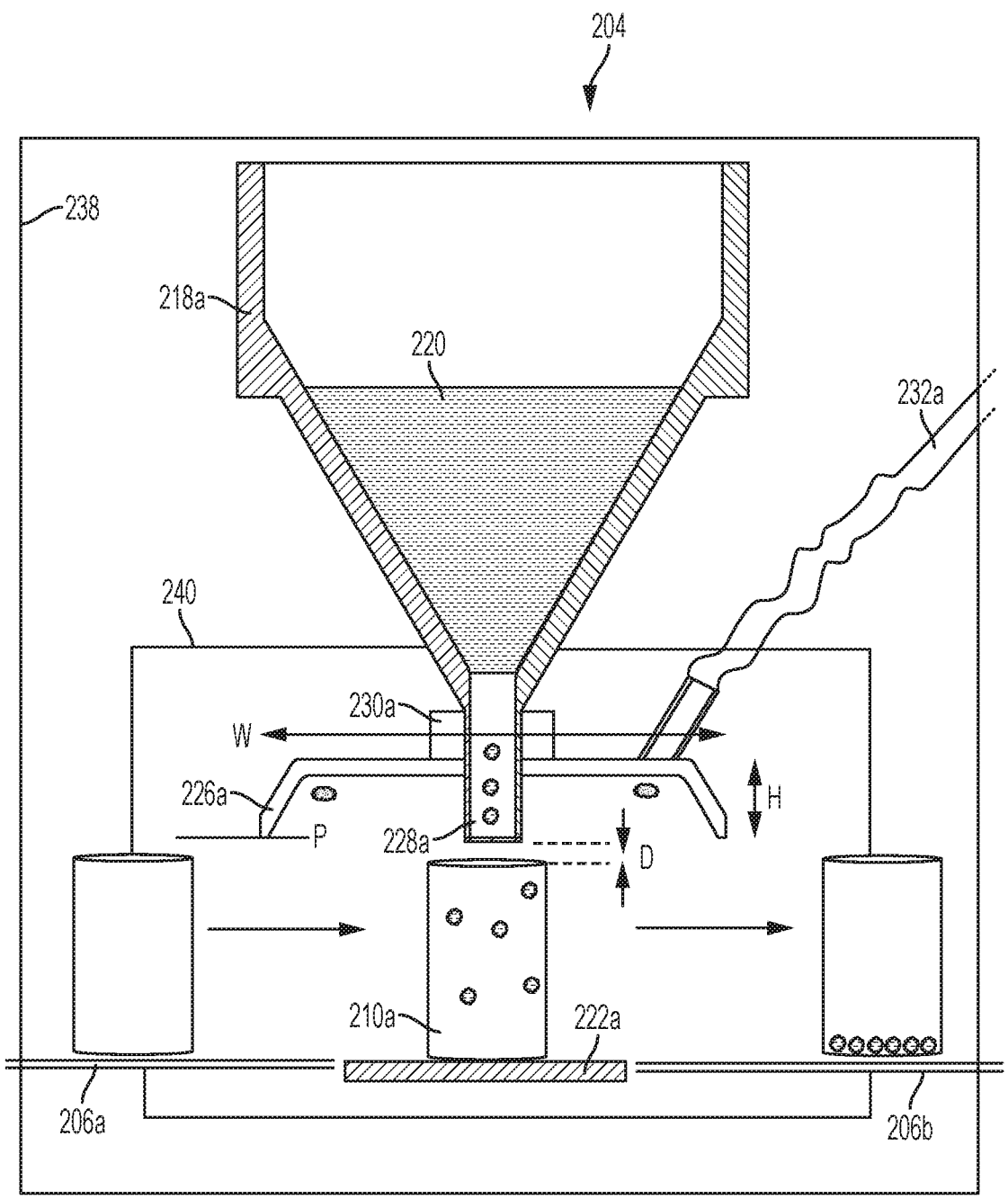
FIG. 4A is an enlarged schematic cross-sectional representation of a filling system having a filler with one filler head according to one embodiment.
Figure 4B:
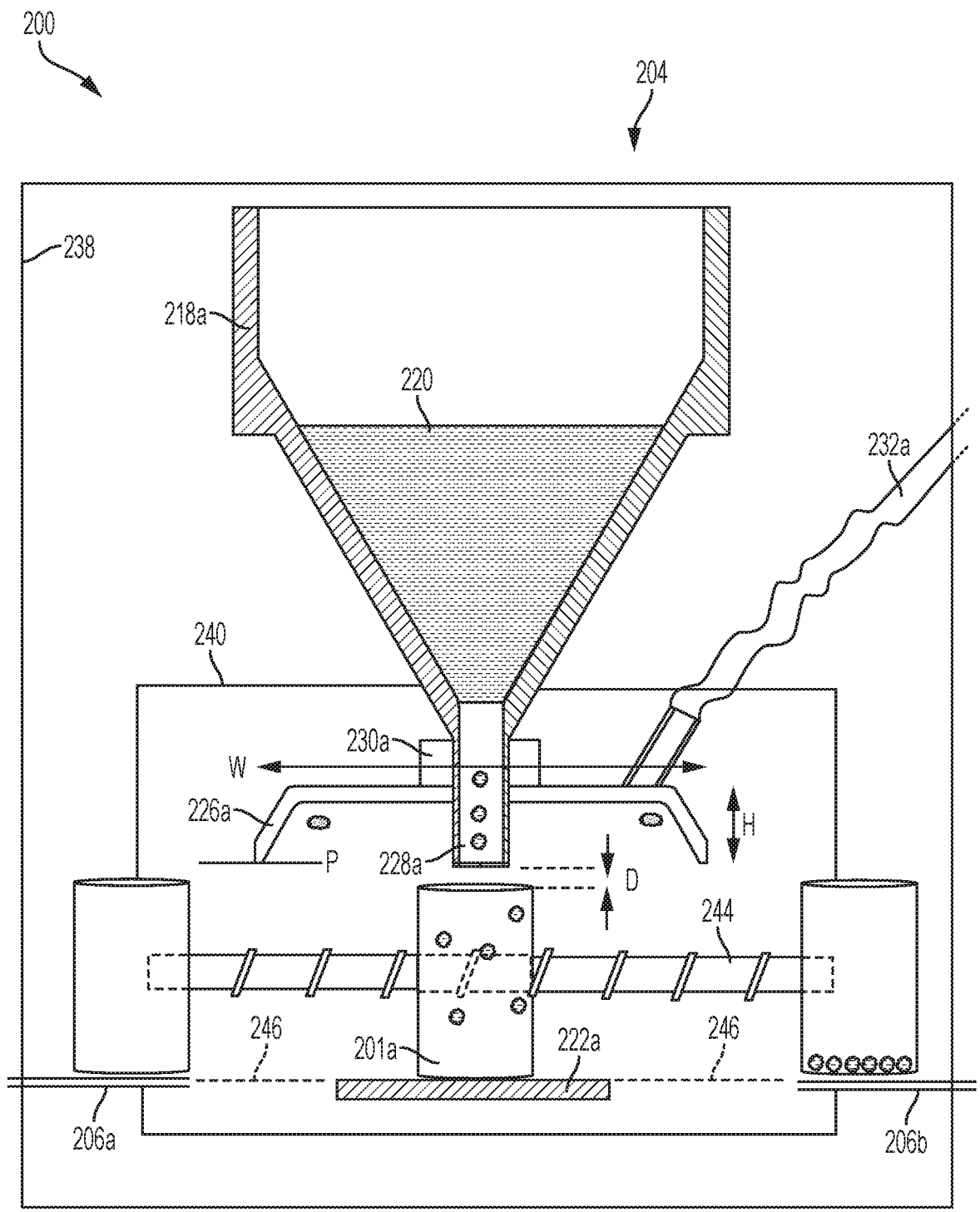
FIG. 4B is an enlarged schematic cross-sectional representation of a filling system having a filler with one filler head according to another embodiment.

Although the filler 204 is shown as being a dual head filler in FIG. 3, in other embodiments, the filler 204 may be a single head filler. For example, as shown in FIGS. 4A and 4B, in other embodiments, the filler 204 may include a single filler head 218a arranged to dispense the powdered pharmaceutical 220 into a bottle 201a positioned below the filler head. As shown in FIGS. 4A and 4B, in embodiments having a single filler head 218a, the filler 204 includes only one weight sensor, load cell 222a, positioned below the filler head 218a. As with other embodiments, the load cell 222a is arranged to measure the weight of the powder dispensed into the bottle 201a via the filler head 218a.

In some embodiments, the load cell includes one or more bottle stabilizers, such as a finger or hook, that holds the bottle in place on the load cell during filling. The one or more bottle stabilizers also may include a leaf spring in other embodiments.

Turning back to FIG. 3, in some embodiments, during the filling process, the bottles 201 may be transferred to the load cell 222a, 222b below the respective filler head via an upstream conveyor belt 206a. In some embodiments, a star wheel 224 also may be used to transfer the bottles to the respective filler heads. For example, the star wheel 224 may rotate to move the bottles between the filler head and conveyor belts. In such an example, the star wheel 224 may rotate to transfer an empty bottle from the upstream conveyor belt 206 to a second, downstream filler head 218b. The star wheel 224 also may rotate to transfer a filled bottle from the first or upstream filler head 218a to the downstream conveyor belt 206b. In some embodiments, the filled bottles are transferred to a downstream station, such as the bottle capper 108 (see FIG. 1), via the downstream conveyor belt 206b (see FIG. 3).

As will be appreciated, other devices also may be used to move the bottles to and from the filler head(s). For example, as shown in FIG. 4A, in embodiments in which there is a single filler head, the bottles may be transferred to and from the filler head 218a via upstream and downstream conveyor belts 206a, 206b. In other embodiments, as shown in FIG. 4B, the bottles may be transferred to and from a single filler head 218a via feedscrews 244. In some embodiments, the system includes two feedscrews that are parallel and spaced from one another. In some embodiment, the two feedscrews rotate relative to another to move a bottle between the feedscrews and to and from the filler head 218a. In some embodiments, the system also includes one or more conveyor belts that transfer the bottles between the feedscrews (and filler head) and different stations of the filling system, such as from the bottle cleaner and descrambler to the feedscrews and then to the bottle capper. For example, as shown in FIG. 4B, an upstream conveyor belt 206a may transfer the bottles to the feedscrews 244, and the feedscrews 244 may transfer bottles to a downstream conveyor belt 206b.

In some embodiments, a secondary conveyor belt 246 may be positioned under the feedscrews 244 to support the bottles being transferred. In such embodiments, the feedscrews 244 may serve as the primary mechanism for transferring bottles two and from the filler head, with the secondary conveyor belt 246 serving only as a support platform for the transferred bottles. As will be appreciated, other support platforms may be used to support the bottles being transferred via the feedscrews. As will be further appreciated, the filling system may have only feedscrews 244 (and not secondary conveyor belts 246) in some embodiments.

According to another aspect, the filler 204 includes a dust shroud arranged to minimize and/or eliminate dust created while the powder is being dispensed into the bottles. As shown in FIGS. 3 and 4A-4B, the dust shroud 226a, 226b may be positioned on a respective filler head, at or near the outlet 228a, 228b of the filler head. For example, the dust shroud may be positioned adjacent to the outlet of the filler head.

In some embodiments, the dual head filler may have two dust shrouds 226a, 226b, one dust shroud on each of filler heads 218a, 218b, while the single head filler has one dust shroud 226a on the single filler head 218a. In some embodiments, the dust shroud 226a, 226b may be permanently attached to the filler head 218a, 218b. For example, the dust shroud may be glued, welded or otherwise affixed to the respective filler head. The dust shroud also may be integrally formed with the filler head. In other embodiments, the dust shroud 226a, 226b may be removably attached to the filler head 218a, 218b. In such embodiments, the dust shrouds maybe selectively attached or removed from a filler head depending upon the powder being dispensed and the likelihood of dust formation. For example, in embodiments in which the powder is unlikely to produce dust that may negatively affect the filling process, the dust shroud may not be attached to the filler head. The dust shroud may thereafter be attached to the filler head if a powder likely to produce dust that could negatively affect the filling process (e.g., by reducing the efficacy of the static reduction devices) is being dispensed via the system.

As shown in FIGS. 4A-4B, in some embodiments, the dust shroud 226a may be attached to the outlet 228a of the filler head via a split collar 230a. In other embodiment, the dust shroud 226a may be threadably attached to the outlet 228 of the filler head. The dust shroud also may be integrally formed with the filler head.

In some embodiments, as also shown in FIGS. 4A-4B, the dust shroud may have a width W that is between about 3 inches and 5 inches, although the dust shroud may have other widths suitable for extracting air and dust from around the filler head outlet. In some embodiments, the width W of the dust shroud may correspond to a size (e.g., width) of the bottle(s) being filled by the filler head. For example, in some embodiments, the dust shroud may be larger than the width (or diameter) of the largest bottle. The dust shroud also may have a width W that is substantially larger than that of the bottles. In some embodiments, the dust shroud is wider than it is tall. For example, the dust shroud may have a height H of between about 0.5 inches and 1 inch, although the dust shroud may have other suitable heights.

In some embodiments, the dust shroud is sized and shaped to pull a desired volume of air and, thus, dust from around the outlet of the filler head. In such embodiments, the dust shroud is sized to minimize the turbulent air flow. For example, in embodiments in which a larger dust shroud is used, a larger volume of air, without turbulent air flow, may be removed In some embodiments, the dust shroud is shaped like a funnel, although the dust shroud may have other shapes in other embodiments. For example, the dust shroud may be semi-hemispherical in shape.

In some embodiments, the dust shroud is positioned above the bottle being filled such that the dust shroud may extract dust particles formed while the powder is dispensed into the bottle. In some embodiments, as shown in FIGS. 4A-4B, a downstream end of the filler head outlet 228a protrudes beyond a plane P extending through (and perpendicular to) a bottom of the dust shroud. That is, the outlet 228a of the filler head may be positioned closer to the bottle than the dust shroud. As will be appreciated, such an arrangement may ensure that the powder intended to be dispensed into the container is not extracted via the dust shroud. As also illustrated in FIGS. 4A-4B, the outlet 228a of the filler head may be positioned a distance D from the top of the bottle. In some embodiments, the distance D between the top of the bottle and the downstream end of the filler head outlet 228a is between about 0.125 inches and 1 inch. In other embodiments, the distance D is between about 0.125 inches and 0.25 inches. As will be appreciated, the distance between the outlet and the top of the bottle may be as small as possible to keep the opening of the bottle close to the filler head outlet during the filling process while still providing a tolerance for variation in bottle heights from the manufacturers.

Although the dust shroud is shown attached to and positioned above each of the filler head outlets in FIGS. 3 and 4A-4B, the dust shroud(s) may be place in other suitable locations for moving air and dust from around the filler head. For example, a dust shroud may be positioned next to, but not attached to, each of the filler head outlets. In other embodiments, such as those where the system includes more there one filler head, there need not be a dust shroud attached to each filler head. For example, a single dust shroud may be positioned over both of the bottles being filled via the dual head filler to remove air and dust from around the outlet of each filler head.

As shown in FIGS. 3 and 4A-4B, the dust shroud may be connected to a vacuum source 235 via one or more conduits, such as a tube 232a, 232b. In some embodiments, the tube may have an inner diameter of about 0.5 inches, although the inner diameter may differ in other embodiments. For example, the inner diameter also may be about 1 inch. In some embodiments, the length of the tube (e.g., from the dust shroud to the vacuum source) may be about 2 feet long, although the length of the tube may be extended or shortened. In such embodiments, the shortened/lengthened tubing may vary the pressure differential being applied via the dust shroud via the vacuum source 235. In some embodiments, the volume of air removable via the dust shroud may be about 137 $ft^3$/min.

According to yet another aspect, the system includes one or more static reduction devices arranged to counteract (e.g., reduce and/or eliminate) static generated during the filling process. In some embodiments, the system, such a filler 204, includes one or more passive static reduction devices. For example, the conveyor belts and/or other pieces of equipment used in the system may be formed of a static dissipating material.

In some embodiments, as shown in FIG. 3, the system, such as filler 204, also may include one or more active static reduction devices, such as static bars 234a. As shown in this view, static bars 234a may be positioned adjacent to the bottles travelling on the upstream convey belt 206a. For example, static bars 234a may be located next to the bottles travelling on the upstream conveyor belt 206a. Although one static bar 234a is shown in these figures, two or more static bars may be used in other embodiments. For example, one or more static bars may be placed on either side of the bottles or on either side of the upstream conveyor belt 206a. In some embodiments, static bars may be located in the same plane as the conveyor belt (e.g., parallel to the conveyor belt) but spaced from the conveyor belt. In some embodiments, one or more static bars may be located beneath the conveyor belt, feed screws, and/or beneath the load cell. As will be appreciated, although static bars are only shown near the upstream conveyor belt, static bars also may be located near the downstream convey belt or near the bottles travelling on the downstream conveyor belt.

In other embodiments, the active status reduction device may include an ionizer 236 positioned near the filler head(s) to minimize static near the filler head(s). In such embodiments, the ionizer may be used to ionize the air in and around the filler head outlet(s).

As will be appreciated, although system of FIG. 3 is shown with both static bars and an ionizer, in other embodiments, the system may include only one type of active static dissipation device. For example, the system may include just static bars or just ionizers. As will be further appreciated, other static reducing devices also may be used in other embodiments to reduce and/or eliminate static generated during the filling process.

According to another aspect, the filler 204 may include one or more housings, also referred to as draft shields, arranged to minimize drafts in and around the filler head. For example, in some embodiments, the filler may include an outer draft shield 238 arranged to reduce and/or prevent large pressure and/or airflow movement from affecting dispensation of the powdered medicine into the containers. As shown in FIGS. 3 and 4A-4B, in some embodiments, the outer draft shield 238 may be positioned around the entire filler. In some embodiments, the outer draft shield may be positioned around the filler head(s), load cell(s), and at least a portion of the upstream and downstream conveyor belts. As will be appreciated, in such embodiments, the housing may include inlet and outlet openings through which the bottles may pass on the respective conveyor belts to travel to and from the filler head(s). In other embodiments, the outer draft shield may be positioned around only the filler head(s).

The filler also may include an inner draft shield 240 to reduce or prevent smaller pressure and/or airflow movement from affecting dispensation of the powdered medicine into the containers. As shown in FIGS. 3 and 4A-4B, such an inner draft shield 240 may be positioned around just the filler head outlet(s), corresponding dust shroud, and the bottle being filled. As with the outer draft shield, the inner draft shield also may include inlet and outlet openings through which the bottles may pass to the respective outlet of the filler head(s).

Although two draft shields are shown in FIGS. 3 and 4A-4B for reducing or eliminating drafts, it will be appreciated that only one draft shield or three or more drafts shields may be used in other embodiments. For example, instead of having a single inner draft shield around both of the filler head outlets in FIG. 3, the filler 204 my include a separate inner draft shield around each of the filler head outlets. In some embodiments, the draft shields may be substantially square or rectangular in shape, as is shown. The draft shields also may have other suitable shapes in other embodiments. As will be appreciated, the shape of the inner draft shield need not be the same as the shape of the outer draft shield. For example, the inner draft shield may be rectangular in shape while the outer draft shield is square in shape. In some embodiments, the draft shields may include a hard plastic enclosure, although other suitable structures (e.g., plastic sheets) may be used.

Figure 5:
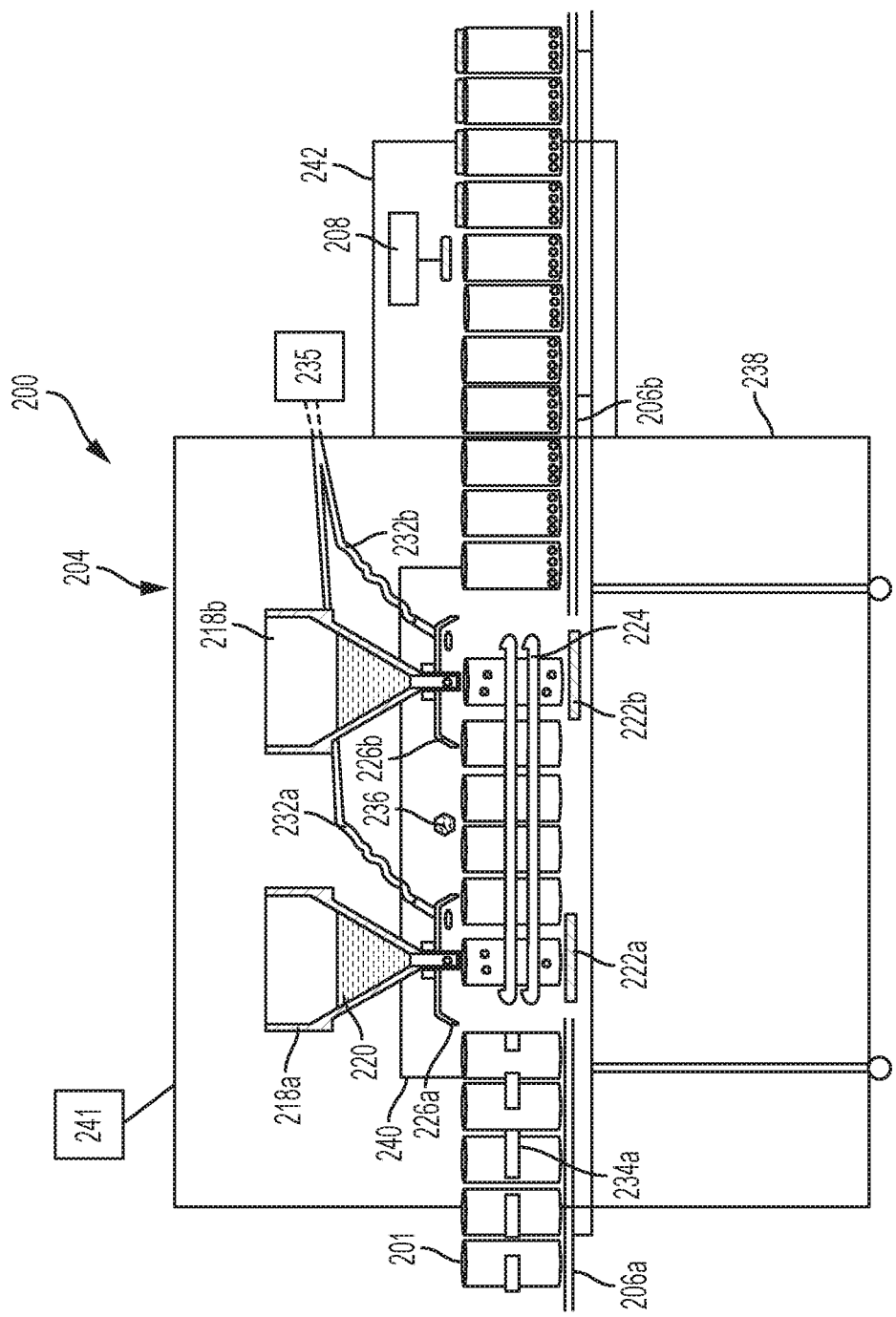
FIG. 5 is a schematic cross-sectional representation of a filling system according to another embodiment.

In some embodiments, as shown in FIG. 5, the system also may include one or more draft shields arranged to prevent and/or eliminate contamination of the powdered medicine being dispensed into the containers. For example, in some embodiments, the system includes a draft shield 242 through which the containers pass after the powdered medicine has been dispensed into the containers but before the containers have been capped and/or sealed. In such an example, the draft shield 242 may be positioned around the bottle capper 208. The draft shield 242 also may be positioned adjacent to the outer draft shield 240.

As will be appreciated, although two drafts shields (outer draft shield 238 and draft shield 242) are used to enclose the filler and one or more downstream stations to reduce and/or eliminate drafts and contamination of the bottles, in other embodiments, a single, larger draft shield may be used to surround the filler and downstream stations to prevent and/or eliminate drafts and contaminations. For example, in some embodiments, the outer draft shield may be sized to enclose both the filler and one or more downstream stations.

In some embodiments, the filler may be manually operated. The filler also may be automatically operated. In such an automatic arrangement, the filler may be connected to a control device 241 (see FIG. 3), which may control operation of the filler. For example, the control device may run an algorithm and instruct the fillers to fill the bottles. As will be appreciated, the control device 241 also may control operation of other stations of the filling system, such as the bottle capper and the labeler. As such, the control device 241 may run other algorithms or processes. As will be appreciated, other processing and/or analysis also may be performed by the control device 241 and/or by the filler 204 (or filling system 200).

Figure 6:
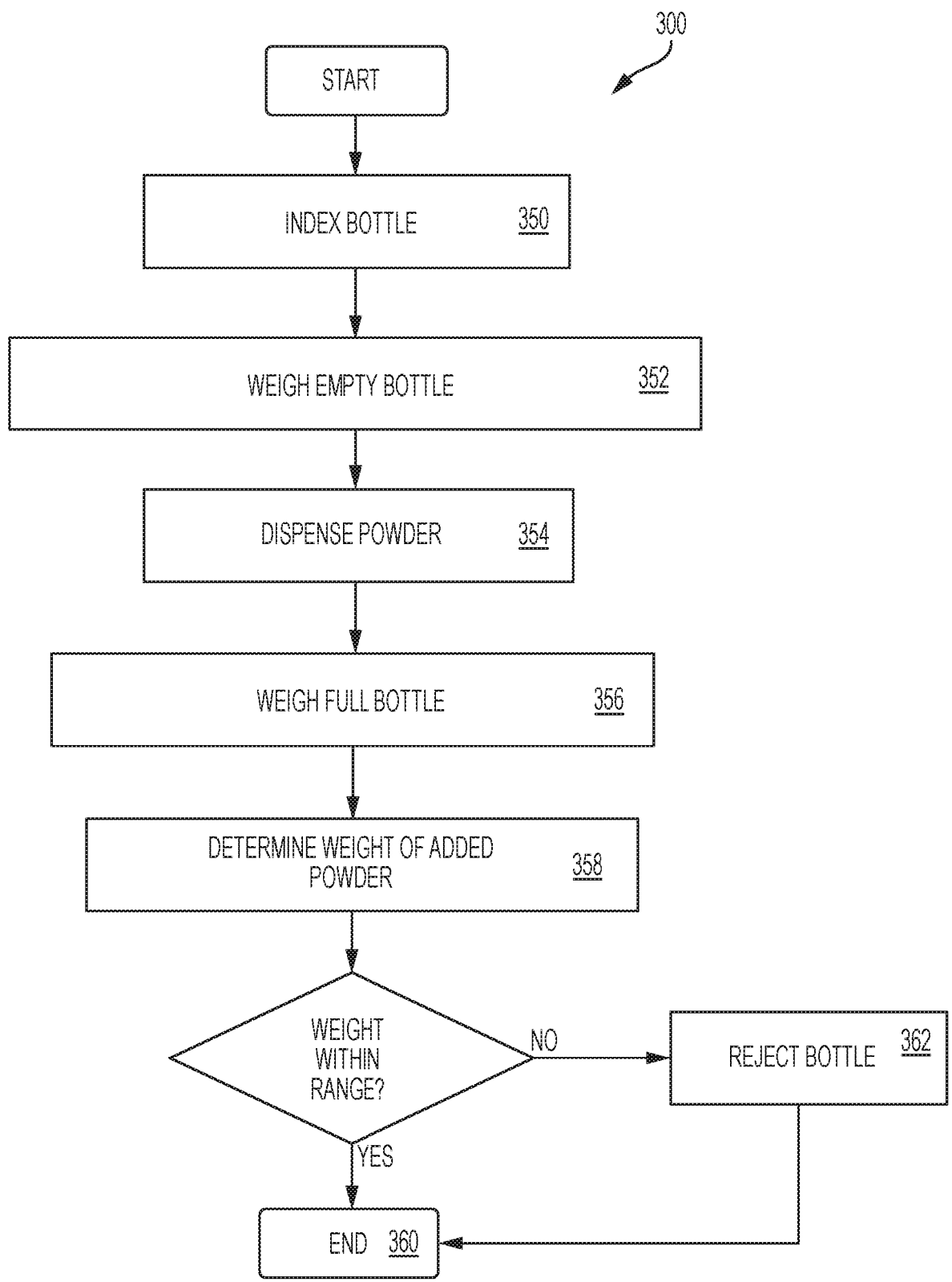
FIG. 6 is a flow chart representing an illustrative algorithm run by a control device of a filling system.

An illustrative example of a filling algorithm 300 is shown in FIG. 6. In some embodiments, the algorithm may include indexing 350 and weighing 352 the empty bottle such that a base weigh may be recorded and stored for each bottle. Next, a powdered pharmaceutical may be dispensed into the bottle 354 via the filler. In some embodiments, the filled bottle may be weighed 356, and the weight of the dispensed powder may be calculated 358, such as by comparing the weight of the filled and empty bottles. If the weight of the powder is within a range including the prescribed weight, plus or minus any allowed tolerances, the filling process will end 360 and the filled bottle will be transferred to a downstream station, such as the capping station (see, e.g., FIG. 1). If the weight is outside the range, the bottle will be rejected 362.

Figure 7:
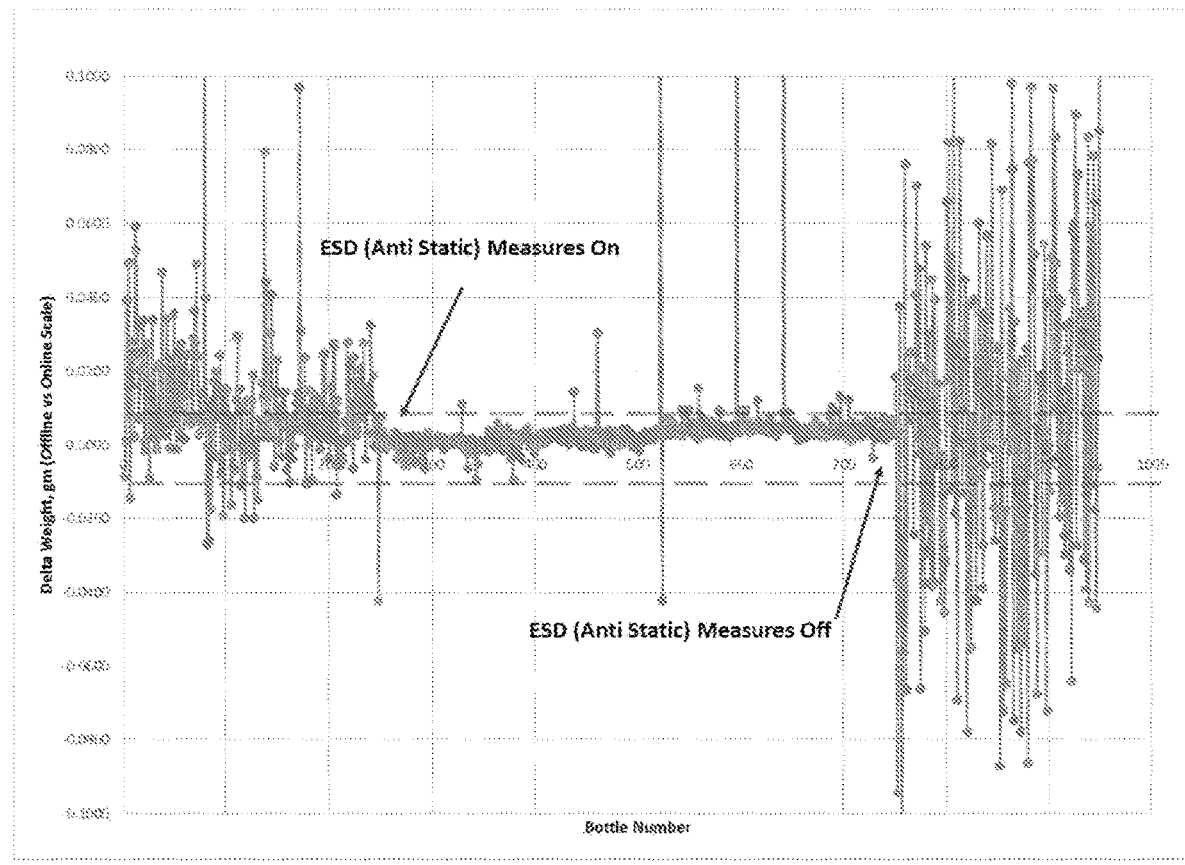
FIG. 7 is a chart illustrating an improved accuracy of a filling system with static reduction devices.

FIG. 7 illustrates an example of a graph showing the improved accuracy achieved with inclusion of the static reduction devices. As will be appreciated, this graph compares the difference between the actual weight of the bottle and the weight registered at the load cell, plotted against the number of bottles being filed. As is shown in this figure, as the number of filled bottles increases, the change in weight becomes erratic due to the pull of static electricity in the filling system (e.g., from static created by the moving bottles). When static reduction devices ESD are enabled, the change in weight between the weight measured by the load cell and the actual weight of the bottle approaches zero. In contrast, when the static reduction devices are disabled, the difference in weights is inconsistent and approaches ±0.1000.

As described with respect to FIGS. 3 and 6, the filler (and filling system) may be connected to a control device 241, which may be used to control operation of the filler 204 (and filling system 200). The control device 241 may be a computer (desktop or laptop), a tablet, a mobile device, or any other suitable apparatus for controlling the device 200. As shown in FIG. 3, the device 241 may be directly connected to the filler 204 (e.g., via a USB connection) or the control device 241 may be indirectly connected to the filler. Such an indirect connection may include an internet, intranet, wireless, Bluetooth or other network connection suitable for indirectly connecting the control device 241 to the filler 204 (and filling system).

Figure 8:
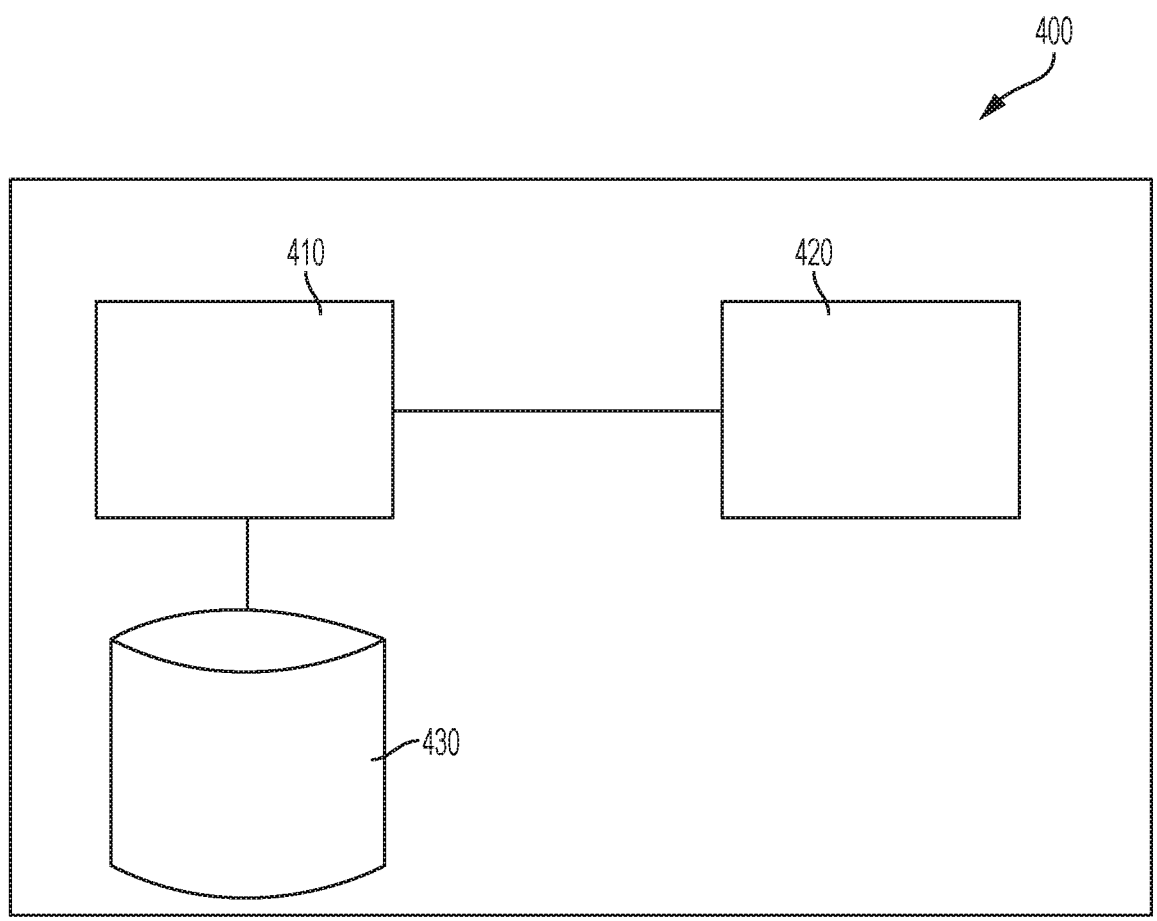
FIG. 8 is a schematic representation of a computer system according to one embodiment.

The control device 241 in accordance with the techniques described herein may take any suitable form, as aspects of the present invention are not limited in this respect. An illustrative implementation of a computer system 400 that may be used in connection with some embodiments of the present invention is shown in FIG. 8. One or more computer systems, such as computer system 400, may be used to implement any of the functionality described above. The computer system 400 may include one or more processors 410 (e.g., processing circuits) and one or more computer-readable storage media (i.e., tangible, non-transitory computer-readable media), e.g., volatile storage 420 (e.g., memory) and one or more non-volatile storage media 430, which may be formed of any suitable non-volatile data storage media. The processor(s) 410 may control writing data to and reading data from the volatile storage 420 and/or the non-volatile storage device 430 in any suitable manner, as aspects of the present invention are not limited in this respect. To perform any of the functionality described herein, processor(s) 410 may execute one or more instructions stored in one or more computer-readable storage media (e.g., volatile storage 420), which may serve as tangible, non-transitory computer-readable media storing instructions for execution by the processor 410.

Although the filling system has been shown and described as dispensing pure API into a container, it will be appreciated that the disclosed system also may be used to dispense a powdered pharmaceutical with API and various fillers, such as glidants and excipients. Such a system also may include a filler having a powder filler head (e.g., a gravimetric filler) and respective load cell (e.g., a magnetic displacement load cell), static reduction devices, and one or more dust shields. The system also may include a dust extractor.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. A system for filling a powdered pharmaceutical into one or more bottles, the system comprising:
 a filler having a first powder filler head arranged to dispense a powdered pharmaceutical into a bottle and a first weight sensor positioned below the first powder filler head;
 one or more static reduction devices arranged to reduce static generated during a filling process;
 an inner draft shield positioned around at least an outlet of the first powder filler head; and
 an outer draft shield positioned around the entire filler.

2. The system of claim 1, further comprising a dust extractor arranged to remove dust generated during the filling process.

3. The system of claim 2, wherein the dust extractor is funnel-shaped.

4. The system of claim 2, wherein the dust extractor includes a dust shroud attached to the outlet of the first powder filler head.

5. The system of claim 4, wherein the dust shroud is connected to a vacuum source and arranged to extract air from around the outlet of the first powder filler head.

6. The system of claim 4, wherein the dust extractor is removably attached to the outlet of the first powder filler head.

7. The system of claim 1, wherein the first powder filler head includes a gravimetric filler.

8. The system of claim 1, wherein the first weight sensor includes a load cell positioned below the first powder filler head.

9. The system of claim 8, wherein the load cell includes a magnetic displacement load cell.

10. The system of claim 1, wherein the one or more static reduction devices includes one or more active static reduction devices.

11. The system of claim 10, wherein the one or more active static reduction devices includes one or more static bars.

12. The system of claim 11, wherein the one or more static bars are positioned upstream of the first powder filler head.

13. The system of claim 12, wherein the one or more static bars are positioned near at least one of an upstream conveyor belt arranged to transfer the one or more bottles to the first powder filler head and the one or more bottles being transferred to the first powder filler head.

14. The system of claim 10, wherein the one or more active static reduction devices includes an ionizer, wherein the ionizer is positioned near the outlet of the first powder filler head.

15. The system of claim 14, wherein the ionizer is positioned within the inner draft shield.

16. The system of claim 1, wherein the one or more static reduction devices includes one or more passive static reduction devices.

17. The system of claim 1, further comprising conveyor belts located upstream and downstream of the first powder filler head, wherein the outer draft shield is positioned around at least a portion of the upstream and downstream conveyor belts.

18. The system of claim 17, further comprising a third draft shield positioned around at least a portion of the downstream conveyor belt and a bottle capper.

19. The system of claim 1, wherein the first powder filler head is arranged to dispense between 25 mg and 100 g of the powdered pharmaceutical.

20. The system of claim 1, wherein the first weight sensor is arranged to weigh a bottle between 15 g and 30 g.

21. The system of claim 1, wherein the first powder filler head has a rotation speed of between 1 rpm and 2000 rpm.

22. The system of claim 1, wherein the filler includes a second powder filler head and a second weight sensor positioned below the second powder filler head.

23. The system of claim 22, wherein the inner draft shield is positioned around at least an outlet of the second powder filler head.

24. The system of claim 1, wherein the powdered pharmaceutical includes a pure active pharmaceutical ingredient.

25. A method of filling a bottle with a prescribed weight of a powdered pharmaceutical via a filling system having a filler with a first powder filler head and a weight sensor positioned below the first powder filler head, one or more static reduction devices arranged to reduce static during a filling process, an inner draft shield, and an outer draft shield, the method comprising:
    transferring an empty bottle to the first powder filler head of a filler, the empty bottle passing by the one or more static reduction devices as the empty bottle moves towards an outlet of the first powder filler head;
    filling the empty bottle with the powdered pharmaceutical via the first powder filler head;
    reducing a draft during a filling process via the inner draft shield positioned around at least the outlet of the first powder filler head and the outer draft shield positioned around the entire filler; and
    transferring a filled bottle from the first powder filler head to a downstream station.

26. The method of claim 25, further comprising extracting dust produced during the filling of the empty bottle at the first powder filler head via one or more dust extractors.

27. The method of claim 26, wherein extracting dust produced during the filling process includes extracting dust via a dust shroud attached to the outlet of the first powder filler head.

28. The method of claim 27, wherein extracting dust produced during the filling process includes applying a vacuum source to the dust shroud to extract air from around the outlet of the first powder filler head.

29. The method of claim 25, wherein filling the empty bottle with the powdered pharmaceutic includes filing the empty bottle with the powdered pharmaceutical until a prescribed weight of the pharmaceutical is dispensed into the bottle.

30. The method of claim 25, wherein filling the empty bottle with the powdered pharmaceutical includes weighing the bottle via the weight sensor positioned below the first powder filler head.

31. The method of claim 30, wherein weighing the bottle via the weight sensor includes weighing the bottle via a magnetic displacement weight sensor.

32. The method of claim 25, further comprising:
    transferring the empty bottle to a second powder filler head of the filler, the empty bottle passing by one or more static reducing devices arranged to reduce static generated during a filling process as the empty bottle moves towards an outlet of the second powder filler head;
    filling the empty bottle with a powdered pharmaceutical via the second powder filler head; and
    transferring a filled bottle from the second powder filler head to a downstream station.

33. The method of claim 32, further comprising extracting dust produced during the filling of the empty bottles at the first and second powder filler head via one or more dust extractors.

34. The method of claim 25, further comprising reducing contamination of the filled bottle via a third draft shield.

35. A system for filling a powdered pharmaceutical into one or more bottles, the system comprising:
    a filler having a first powder filler head arranged to dispense a powdered pharmaceutical into a bottle and a first weight sensor positioned below the first powder filler head;
    one or more static reduction devices arranged to reduce static generated during a filling process;
    an inner draft shield positioned around an outlet of the first powder filler head, the powdered pharmaceutical being dispensed into the bottle via the outlet; and
    an outer draft shield positioned around the filler.

36. The system of claim 35, wherein the inner draft shield extends below the outlet of the first powder filler head.

37. The system of claim 35, wherein the inner draft shield extends laterally outwardly from the outlet of the first powder filler head.

38. The system of claim 35, wherein the inner draft shield is positioned around a portion of the bottle.

39. The system of claim 35, wherein the inner draft shield is configured to minimize airflow disruption of the powdered pharmaceutical between the outlet and the bottle.

* * * * *